United States Patent [19]

Ishishita

[11] Patent Number: 5,684,397
[45] Date of Patent: Nov. 4, 1997

US005684397A

[54] MAGNETORESISTIVE SENSOR

[75] Inventor: Kiyomi Ishishita, Tokyo, Japan

[73] Assignee: NEC Corporation, Tokyo, Japan

[21] Appl. No.: 566,945

[22] Filed: Dec. 4, 1995

[30] Foreign Application Priority Data

Dec. 7, 1994 [JP] Japan .................. 6-302543

[51] Int. Cl.$^6$ .................................. G01P 13/00
[52] U.S. Cl. ........................ 324/252; 338/32 R
[58] Field of Search ............ 324/252, 207.21; 338/32 R

[56] References Cited

U.S. PATENT DOCUMENTS

| 3,172,032 | 3/1965 | Hunt | 324/252 |
|---|---|---|---|
| 3,928,836 | 12/1975 | Makino et al. | 338/32 R |
| 3,949,346 | 4/1976 | Makino et al. | 338/32 R |
| 3,965,463 | 6/1976 | Chaudhari et al. | 340/174 TF |
| 4,053,829 | 10/1977 | Maruo | 338/32 R |
| 4,401,944 | 8/1983 | Narimatsu et al. | 324/207 |
| 4,492,922 | 1/1985 | Ohkubo | 338/32 R |
| 4,533,872 | 8/1985 | Boord et al. | 324/252 |
| 4,847,584 | 7/1989 | Pant | 338/32 R |
| 5,585,719 | 12/1996 | Endo et al. | 324/207.21 |
| 5,585,775 | 12/1996 | Ishishita | 324/207.21 |

FOREIGN PATENT DOCUMENTS 1-316980  12/1989  Japan .................. 338/32 R

*Primary Examiner*—Ronald Biegel
*Attorney, Agent, or Firm*—Scully, Scott, Murphy & Presser

[57] ABSTRACT

A first magnetoresistive (MR) element of an MR element portion of the MR sensor has line patterns of a ferromagnetic thin film, that are arranged in parallel to each other, and connecting patterns that connect ends of the line patterns. The resistance of the MR element is set only by the length of the ferromagnetic thin film, irrespective of formation and removal of an Au layer. The connecting patterns, that connect between the line patterns of the ferromagnetic thin film, are designed in a configuration so as not to be influenced by a magnetic field which may cause variation of resistance value of the ferromagnetic thin film of the line pattern. The end of the connecting portion pattern is formed into an angle configuration having a portion oriented at a 45° angle relative to the longitudinal direction of the line pattern. This avoids influence of the applied magnetic field. Adjacent to the outermost line pattern, an adjacent pattern is arranged. Second to fourth MR elements have the same construction. The four MR elements are connected in a form of bridge so that a potential difference, depending upon variation of the magnetic field, is obtained through a terminal. The connecting pattern can be of any configuration so long as influence of the magnetic field can be avoided, and thus, an arc-shaped configuration may be used.

16 Claims, 8 Drawing Sheets

5,684,397

MAGNETORESISTIVE SENSOR

BACKGROUND OF THE INVENTION

1. Field of the Invention

The present invention relates to a magnetoresistance (MR) sensor having MR elements of a ferromagnetic body to be employed for detecting rotation and position of parts and/or devices. The MR sensor also has a wave shaping processing circuit. More specifically, the invention relates to an MR sensor having both the MR elements and the wave shaping circuit integrated on the same chip.

2. Description of the Related Art

In general, an MR sensor is employed in equipment having rotary parts, such as a water flow rate sensor for measuring a water flow amount of a water heater, a speed meter of an automotive vehicle, or the like. The MR sensor detects variation of the magnetic field generated from the rotation of the rotary parts. In addition, the MR sensor measures this rotation speed. The MR sensor is also used for detecting the position of a cylinder incorporated in a robot, for example, by performing switching operations.

The conventional MR sensor has an MR element portion and a wave shaping processing circuit portion. The wave shaping processing circuit portion performs wave shaping of the output of the MR element portion. The MR element portion generally includes four MR elements (first to fourth magnetically resistive bodies), which are connected to form a bridge circuit. The four MR elements are connected to form four terminals of the MR element portion. These four terminals connect the MR element portion to the wave shaping processing circuit portion. One of these four terminals is connected to a power supply terminal, which is connected to a power supply for providing a voltage Vcc. Another terminal is connected to a grounding or return terminal, which is connected to ground.

The remaining two terminals are connected to a non-inverting (+) and inverting (−) inputs of a comparator, which is located within the wave shaping processing circuit 12. In addition, the non-inverting (+) input is connected to one end of a feedback resistor. The other end of the feedback resistor is connected to an MR sensor feedback terminal.

The power high and return terminals of the comparator are connected to the power and return terminals, respectively. The MR element portion has a structure in which a plurality of elements having effect as magnetoresistive elements (hereinafter referred to as MR effect elements) are arranged in an array. These magnetoresistive effect elements are typically formed of a ferromagnetic film of Ni-Fe alloy.

The MR effect elements have pattern turned back portions. On the pattern turned back portions, a conductor layer, such as an Au layer or an Al layer and so forth, is formed.

The pattern turned back portion of one of the four MR elements, e.g., of the second MR element, is extended to be longer than the corresponding pattern turned back portions of the first, third and fourth MR elements. In the absence of a magnetic field, the extended pattern turned back portion maintains the potential of its terminal at a higher level than the potential of other terminals. This fixes an initial voltage level.

The MR elements are arranged in an orientation that provides a maximum difference in resistance between adjacent MR elements, where the MR elements resistance values vary as a function of the magnetic field direction. For instance, when a magnetic field is in a direction which is perpendicular to the longitudinal direction of the MR effect elements of the first and fourth MR elements, the resistance values of these MR elements become minimum, and the resistance values of the second and third MR elements become maximum.

In general, the direction of the magnetic field where the resistance value becomes maximum is referred to as the easy magnetization axis direction. On the other hand, the direction of the magnetic field where the resistance value becomes minimum is referred to as the hard axis direction. It should be noted that the first to fourth MR elements have a zigzag pattern. The zigzag pattern facilitates adjustment of the overall length of the MR effect elements, in order to provide an electrical resistance higher than or equal to 10 KΩ.

In the conventional MR sensor set forth above, the resistance values of respective MR elements of the MR element portion are set by forming the conductor layer, e.g., of Au layer, Al layer or so forth, on the upper layer of the turned back portion of the ferromagnetic film pattern. After forming the conductive layer on the MR element, a portion of the conductive layer is removed, while leaving a portion having the necessary conductor length. Since the resistance of the conductive layer remaining on the MR element is substantially zero, the initial resistance value of the MR elements is set by the length of the remaining conductor portion.

However, precision of the MR elements initial resistance values of the conventional MR sensor is low. Accordingly, the conventional MR sensor has limited precision, resulting in imprecise measurements. The turned back portion of the MR elements lowers the precision in setting the resistance value of the MR element.

SUMMARY OF THE INVENTION

It is an object of the present invention to increase precision of the MR elements of the MR element portion.

Another object of the present invention is to prevent magnetic characteristics of the MR element from deteriorating.

In order to eliminate the cause of precision deterioration of the resistance value of an MR element, the MR sensor according to the present invention employs a construction not requiring formation and removal of an Au layer. Instead, the resistance value of the MR element is set only by the length of the pattern of the ferromagnetic thin film.

In setting of the resistance value only by the length of the pattern of the ferromagnetic thin film, another problem of lowering of magnetic characteristics may be encountered. In order to solve this problem in the MR sensor according to the present invention, connecting patterns between line patterns of the ferromagnetic thin film are formed into configurations which are not influenced by a magnetic field that causes variation of the resistance value of the ferromagnetic thin film of the line patterns.

An MR sensor, according to the present invention, comprises an MR element including a plurality of ferromagnetic thin films defining a plurality of line patterns having equal lengths to each other and arranged in parallel relative to each other; and a ferromagnetic thin film defining connection patterns that alternately connect ends of adjacent line patterns of said line pattern ferromagnetic thin film, to form a zigzag pattern.

In the MR sensor according to the present invention, the upper portion of the MR element is not covered with a conductive layer. The connecting pattern ferromagnetic thin film is provided a configuration capable of avoiding fluctuation of resistance value thereof due to a magnetic field that causes variation of the resistance value of said line pattern ferromagnetic thin film.

As a practical configuration of the connecting pattern, which is not influenced by the magnetic field that causes variation of the resistance value of the line pattern ferromagnetic thin film, the MR sensor according to the present invention has an angled configuration having a portion lying 45° relative to the direction of the line pattern. Also, as another configuration of the connecting pattern, a configuration for connecting the line pattern in arc-shape is provided.

In the MR element of the magnetic resistance sensor according to the invention, the MR element further includes an adjacent pattern of ferromagnetic thin film in a line form. This line of adjacent ferromagnetic pattern is formed on the substrate in parallel to the line pattern adjacent to the outermost line pattern.

In addition, the MR sensor according to the present invention, further comprises at least four MR elements, a part of these is arranged in an orientation perpendicularly intersecting the line pattern of other MR elements. The MR elements are connected to voltage applying terminals for applying a voltage to opposing two contact points. The two contact points are provided with voltage detecting terminals, through which a voltage, representative of a potential difference depending upon the magnetic field, is measured from the remaining two terminals.

The MR sensor according to the present invention, further comprises a hysteresis comparator that receives potentials, which are detected at the voltage detecting terminals, at two input terminals; compares a difference of the potentials with two threshold levels; and outputs a wave-shaped digital signal. The MR elements and the hysteresis comparator may be integrated on a common substrate. By digitizing the potential difference obtained from a bridge circuit, which digitizing is achieved by comparison with two threshold levels, hysteresis is provided for output characteristics to avoid or reduce influence of noise to the output of the MR sensor.

The MR sensor according to the present invention, comprises four MR elements, said four MR elements being arranged with 90° of angular offset to each other to form four magnetic resistance sensor having mutually identical patterns. The MR element has maximum variation amount of the resistance value when the direction of the applied magnetic field varies from the longitudinal direction of the line pattern to a direction which is perpendicular thereto.

The length of line patterns of one of the MR element is different from the length of the line patterns in the other MR elements. With this construction, four MR element are employed, for example to form a bridge circuit. Accordingly, the potential difference that depends upon application of a magnetic field is precisely measured.

Also, among a plurality of MR elements, the line pattern portion length of one of them is different from those of other MR elements. With such a structure, in the absence of a magnetic field, the bridge circuit is placed in an unbalanced condition to make the circuit stable.

The MR sensor according to the present invention does not cover with a conductive layer the connecting portion patterns, which alternatively connect ends of mutually adjacent line patterns. With this structure, setting of the resistance value by etching the conductive layer, such as a thin film of gold or so forth, as required in the prior art, becomes unnecessary. In addition, in this structure of the present invention, the initial resistance value of the MR element is set only with the length of the line pattern. Since the line pattern and the connecting pattern are not covered with a conductor, degradation of characteristics due to fluctuation of the conductor is avoided.

The MR sensor according to the present invention, constructed as set forth above, is provided with a line form adjacent pattern of ferromagnetic thin film, arranged adjacent the outermost line pattern portion forming the MR element in parallel, similarly to the first mentioned construction. With this construction, degradation of characteristics by thinning of the width of the outermost line pattern formed on the substrate is avoided. Also, the MR sensor according to the present invention integrates the magnetically resistive bodies and the hysteresis comparator on a common substrate. By this, down-sizing of the device, and lowering of cost, are achieved.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

At first, in advance of discussion for the construction of the MR sensor according to the present invention, discussion will be given for a construction of the conventional MR sensor in order to facilitate clear understanding of the invention.

Figure 1:
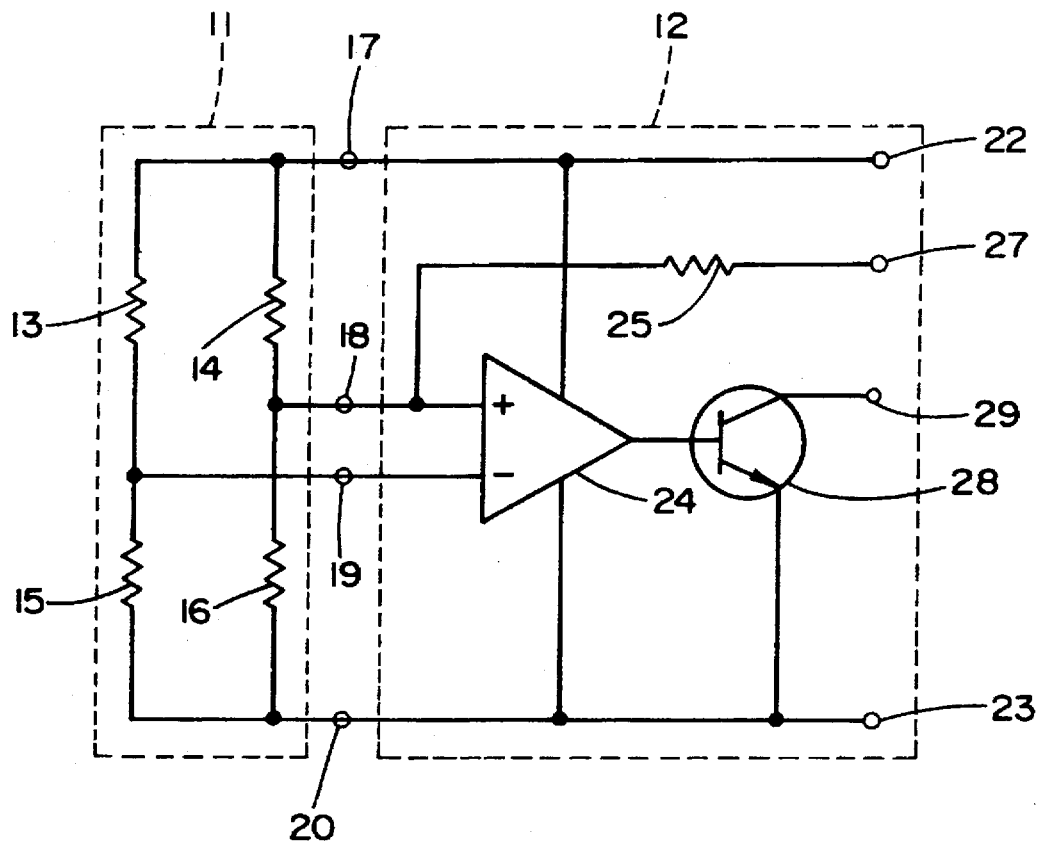
FIG. 1 is a circuit diagram showing one example of a circuit construction of a general MR sensor.

FIG. 1 shows an equivalent circuit of one example of a conventional MR sensor. The conventional MR sensor includes an MR element portion 11 and a wave shaping processing circuit portion 12. The wave shaping circuit portion 12 performs wave shaping of the output of the MR element portion 11. The MR element portion 11 is constructed of four MR elements 13, 14, 15, 16, which are connected to form a bridge circuit. The four MR elements 13, 14, 15, 16 are connected to form four terminals 17, 18, 19, 20 of the MR element portion 11. The four terminals 17, 18, 19, 20 connect the MR element portion 11 to the wave shaping processing circuit portion 12.

Terminal 17 connects together one end of the first and second MR elements 13, 14. In turn, terminal 17 is connected to the MR sensor power terminal 22, which is connected to a power supply (not shown) for providing a voltage Vcc. Similarly, terminal 20 connects together one end of the remaining two MR elements, i.e., third and fourth MR elements 15, 16. Terminal 20 is connected to the MR sensor return terminal 23, which is connected to ground (not shown).

MR elements 14, 16 are connected in series with terminal 18 being connected therebetween. Similarly, MR elements 13, 15 are connected in series, with terminal 19 being connected therebetween. In turn, terminal 18 is connected to a non-inverting (+) input of a comparator 24, which is located within the wave shaping processing circuit 12. In addition, terminal is connected to one end of a feedback resistor 25. The other end of the feedback resistor 25 is connected to an MR sensor feedback terminal 27.

The inverting (−) input of the comparator 24 is connected to terminal 19. The power high and return terminals of the comparator 24 are connected to the power and return terminals 22, 23, respectively. The output terminal of the comparator 24 is connected to the base of an NPN transistor 28, whose emitter is connected to the return terminal 23. The collector of the NPN transistor 28 is the MR sensor output terminal 29. The NPN transistor 28 prevents current from flowing into the comparator 24 when an external circuit is connected to the output terminal 29.

Figure 2:
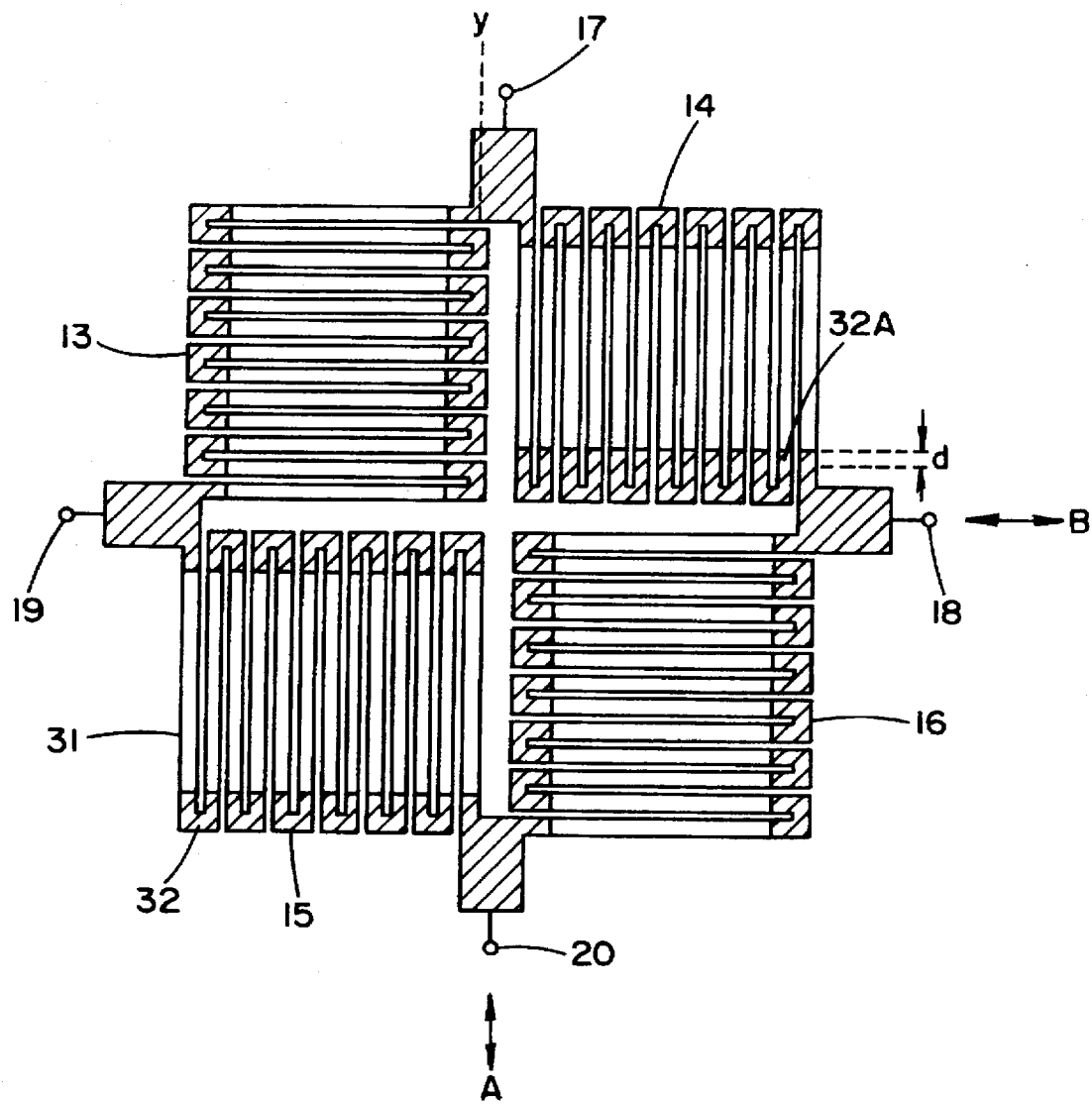
FIG. 2 is a plan view illustrating an MR element portion of the conventional MR sensor of FIG. 1.

FIG. 2 shows the structure of the MR element portion 11 of FIG. 1. The MR elements 13, 14, 15, 16 in the MR element portion 11 are a plurality of MR effect elements 31 arranged in an array. These magnetoresistive effect elements 31 are typically formed of a ferromagnetic film of Ni-Fe alloy.

The MR effect elements 31 have pattern turned back portions 32, shown in FIG. 2 with cross hatching. On the pattern turned back portions 32, a conductor layer, such as Au layer or Al layer and so forth, is formed (shown as layer 11c in FIG. 3).

The pattern turned back portion of one of the four MR elements, e.g., of the second MR element 14, is extended to be longer than the corresponding pattern turned back portions 31 of the first, third and fourth MR elements 13, 15, 16. This extended pattern turned back portion of the second MR element 14 is shown as reference numeral $32_A$ in FIG. 2. FIG. 2 also shows the additional conductive layer distance d of the extended pattern turned back portion $32_A$. In absence of a magnetic field, the extended pattern turned back portion $32_A$ maintains the potential of terminal 18 at a higher level than the potential of the other terminals. This fixes an initial voltage level.

The MR element 13, 14, 15, 16 are arranged in an orientation that provides a maximum difference in resistance between adjacent MR elements 13, 14, 15, 16, where the MR elements resistance varies as a function of the magnetic field direction. For instance, when a magnetic field is in the direction of the arrow A, i.e., perpendicular to the longitudinal direction of the MR effect elements 31 of the first and fourth MR elements 13, 16, the resistance values of these MR elements 13, 16 become minimum, and the resistance values of the second and third MR elements 14, 15 become maximum.

Conversely, in the presence of a magnetic field in the direction of arrow B, along the longitudinal direction of the MR effect elements of the first and fourth MR elements 13, 16, the resistance values of these MR elements 13, 16 become maximum. As a result, the resistance values of the second and third MR elements 14, 15 become minimum.

In general, the direction of the magnetic field where the resistance value becomes maximum is referred to as the easy magnetization axis direction. On the other hand, the direction of the magnetic field where the resistance value becomes minimum is referred to as the hard axis direction. It should be noted that the first to fourth MR elements 13, 14, 15, 16, have a zigzag pattern. The zigzag pattern facilitates adjustment of the overall length of the MR effect elements 31, in order to provide an electrical resistance higher than or equal to 10 KΩ.

Returning to FIG. 1, the comparator 24 in the wave shaping processing circuit 12 performs process for obtaining the potential difference between the voltage values of the comparator non-inverting (+) and inverting (−) input terminals.

First and second threshold voltage levels are provided to the comparator 24. When the level of the potential difference exceeds a first threshold level, the comparator 24 outputs a low (L) level signal to the output terminal 29. On the other hand, when the level of the potential difference becomes smaller than the second threshold level, the comparator 24 outputs a high (H) level signal. Thus, the comparator 24 serves as a hysteresis comparator.

With such an arrangement, fluctuation of the output level can be suppressed by obtaining a digital signal having a noise-free output characteristic devoid of any chattering, even when the potential difference between the inverting and non-inverting terminals fluctuates due to noise.

The potential difference of the first and second threshold levels is determined by the feedback resistor 25. In the normal case, the feedback resistor 25 is connected to provide positive feedback of the output of the comparator 24. In the prior art MR sensor shown in FIG. 1, the feedback resistor 25 is connected between the non-inverting (+) input terminal of the comparator 24 and the feedback terminal 27. This reduces power consumption due to using the feedback terminal 27 for intermittent operation of the MR sensor. This is especially important in the case where a battery is employed as a power source.

In the MR sensor, an output level of the immediately preceding operation cycle is temporarily stored in an external memory. The feedback amount provided to the feedback terminal 27 is varied depending upon the stored level, in order to continuously perform operations subsequent to the immediately preceding cycle. The access to the external memory is performed by a central processing unit (CPU), which is not shown in FIG. 1.

In order to perform a continuous operation without performing intermitted operations, the output of the comparator 24 is fed back to its non-inverting (+) input terminal. In this example, the resistance value of the feedback resistor 25 is set at a value greater than or equal to 1 MΩ.

Figure 3:
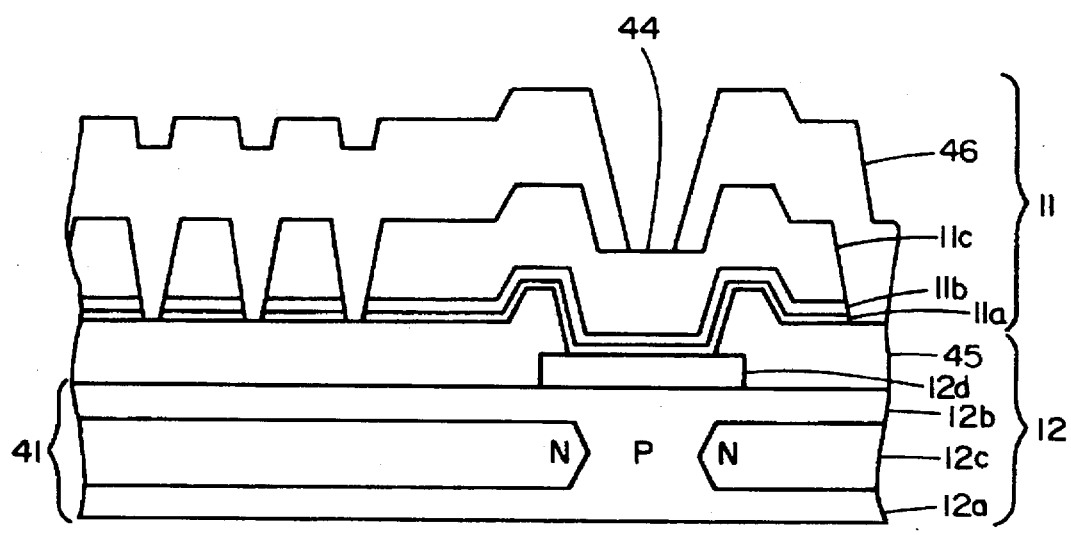
FIG. 3 is a section illustrating a cross sectional view of an MR element portion and its peripheral portion shown in FIG. 2.

FIG. 3 shows a cross-sectional view of the MR element portion shown in FIG. 2 and its periphery, such as the NPN transistor 28 of FIG. 1. In particular, FIG. 3 shows the cross section along the broken line y of FIG. 2. As shown in FIG.

3, on a Si substrate, a part of a bipolar type or MOS type wave shaping processing circuit 12 is formed. The wave shaping processing circuit 12 comprises a diffusion layer 12a, a P doped layer 12b, an N doped layer 12c, and an Al electrode wiring layer 12d.

On the wave shaping processing circuit 12, an insulation layer 45 of Si-N is formed. The insulating layer does not cover a portion of the Al layer 12d in order to provide a connecting pad portion 44. On the connecting pad portion 44, a power source (not shown) is connected to provide a voltage Vcc to the terminal 17 of FIG. 2.

On the insulating layer 45 of the wave shaping processing circuit portion 12, the MR element portion 11 is formed. The MR element portion 11 comprises a conductor undercoat layer 11a, a ferromagnetic thin film 11b, and a conductor layer 11c. The conductive undercoat layer 11a is formed with Cr or Ti having a thickness in the order of several 10 to 150 Å. The ferromagnetic thin film 11b is formed of Ni-Fe alloy, or Ni-Fe-Co alloy, in the order of 300 to 600 Å. The conductive layer 11c is formed of Au in the order of 1 to 1.5 μm. The MR element portion 11, excluding the connecting pad portion 44, is covered with a protective layer 46 of $SiO_2$.

The operation of the MR sensor constructed as set forth above will now be discussed. The resistance values of the first to fourth MR elements 13, 14, 15, 16 are assumed to be R1, R2, R3, R4, respectively. In addition, θ is the angle of the applied rotating magnetic relative to the B direction of FIG. 2. Variation of resistance values in a rotating field, which is greater than or equal to a saturated magnetic field, can be expressed by the following equations:

$$R_1(\theta) = R_{1\ min} \sin^2 \theta + R_{1\ max} \cos^2 \theta$$

$$R_2(\theta) = R_{2\ min} \sin^2 \theta(\Pi/2-\theta) + R_{2\ max} \cos^2 \theta(\Pi/2-\theta)$$

$$R_3(\theta) = R_{3\ min} \sin^2 \theta(\Pi/2-\theta) + R_{3\ max} \cos^2 \theta(\Pi/2-\theta)$$

$$R_4(\theta) = R_{4\ min} \sin^2 \theta + R_{4\ max} \cos^2 \theta$$

where, $R_{n\ max}$ (n=1 to 4) is the maximum resistance value (designed resistance value); and $P_{m\ min}$ is the minimum resistance value.

Rn min is the resistance value of the first to fourth MR elements 13 to 16 as magnetized in the hard axis direction.

Assuming that the voltages appearing on the inverting (−) and not inverting (+) input terminals of the comparator 24 are respectively $V_{IN1}$ and $V_{IN2}$, these voltages can be expressed as follows.

$$V_{IN1} = Vcc \times R_3/(R_1+R_3)$$

$$V_{IN2} = Vcc \times R_4/(R_2+R_4)$$

where,

Vcc is the voltage (power source voltage) between the power source terminal 22 and the grounding or return terminal 23 shown in FIG. 1.

The output level of the output terminal 29 of the wave shaping processing portion 12 changes from H level to L level, when the potential difference $V_{IN}$, i.e., ($V_{IN2}-V_{IN1}$), of the inverting (−) and non-inverting (+) input terminals of the comparator 24 exceeds the first threshold level. The first threshold level is the sum of an offset voltage $V_{IO}$, provided for the comparator 24, plus a hysteresis width $V_{HY}$, i.e., ($V_{IO}+V_{HY}$).

Conversely, when the potential difference is reduced below the second threshold level, the output level of the output terminal 29 of the wave shaping processing portion 12 changes from the L level to the H level. The second threshold level is the offset voltage $V_{IO}$.

The maximum variation amount of the potential difference $V_{IN}$ between the inverting (−) and non-inverting input terminals of the comparator 24 is ΔV. This maximum variation amount ΔV can expressed by equation (1):

$$\Delta V = |V_{IN}(\theta=0) - V_{IN}(\theta=\Pi/2)| = Vcc \times \Delta R/Ro \quad (1)$$

where, $R_0$ is $R_{n\ max}$; and

ΔR is the maximum variation amount of the resistance in an elapsed time.

It should be noted that the foregoing equation (1) is an approximation.

Thus, the maximum variation amount ΔV of the potential difference $V_{IN}$, between the two input terminals of the comparator 24, is proportional to the variation rate of the MR ratio $\Delta R/R_0$ in the MR element 13, 14, 15, or 16.

In the magnetically resistive element portion 11 shown in FIG. 2, during absence of a magnetic field, the second magnetically resistive body or element 14, among the first to fourth magnetically resistive bodies 13 to 16, is constructed to have a resistance value which is different from the resistance values of the first, third and fourth magnetically resistive bodies 13, 15 and 16. As discussed above, this is due to the additional distance d (FIG. 2) of the conductive layer of the extended pattern turned back portion $32_A$.

This difference in resistive values destroys the balance of the bridge circuit. The balance of the bridge circuit is changed by adjusting the resistance value of the second magnetically resistive body 14 to be smaller than those of the resistance values of the first, third and fourth magnetically resistive bodies 13, 15 and 16. This imbalance provides an initial offset voltage $V_{OS}$. Thus, the initial output level is fixed at H level.

In this case, the initial offset voltage $V_{OS}$ has a following relationship:

$$V_{IO}+V_{HYS} < V_{OS} < \tfrac{1}{2} \Delta V$$

It should be noted that the offset voltage $V_{IO}$ is in the extent of 0±10 mV, and the hysteresis width or voltage $V_{HYS}$ is in the extent of 7 to 35 mV.

In the conventional magnetic resistance sensor as set forth above, the resistance values of respective magnetically resistive bodies 13 to 16 of the magnetically resistive element portion 11 are set by forming the conductive layer 11c (FIG. 3), such as an Au layer, an Al layer or so forth, on the upper layer of the pattern turned back portion 32 (FIG. 2) of the ferromagnetic thin film pattern.

However, in etching the Au layer or so forth, particularly in wet etching, it is difficult to precisely set the edge portion at the desired position due to the possibility of overetching or drooping of the edge. As a result, an error is caused in the length of the resistive portion in the MR element, which resistive portion is not covered by the conductive layer located over the pattern turned back portions 32, $32_A$ of FIG. 2. This length error (of the resistive portion, or of the conductive layer) reduces precision of the resistance values of respective MR elements 13 to 16.

It is possible to employ dry etching for performing etching. However, since the ferromagnetic film 11b (FIG. 3)

of the MR effect elements 31 (FIG. 2) is thin, it is possible to damage the ferromagnetic thin film pattern by dry etching.

In addition, when the resistance values of respective MR elements 13 to 16 of the MR element portion 11 are achieved with the ferromagnetic thin film pattern, (e.g., the zigzag pattern,) the easy magnetization axis direction of the turned back portion 32, $32_A$ (FIG. 2) is different from the easy magnetization axis direction of remaining pattern portions. The turned back portion 32, $32_A$ (FIG. 2) lowers the magnetic characteristics of the MR element 13 to 16.

Commonly owned Japanese Patent Application No. Heisei 6-86647 discloses a technology for eliminating the conductive layer on the turned back portion 32, $32_A$ shown in FIG. 2. In the disclosed technology, the magnetically resistive body or element 13, 14, 15, or 16, is formed with a ferromagnetic thin film, where the turned back portion 32, $32_A$ has a width which is greater than the width of the line pattern of the remaining portions of the MR element 13, 14, 15, or 16. However, in such a structure, the turned back portion, having a large width, occupies a large area. This increases area of the overall pattern, which increase is undesirable as it consumes valuable space and prevents miniaturization. Therefore, there is a room to be improved.

Next, the MR sensor according to the present invention will be discussed in detail.

Figure 4:
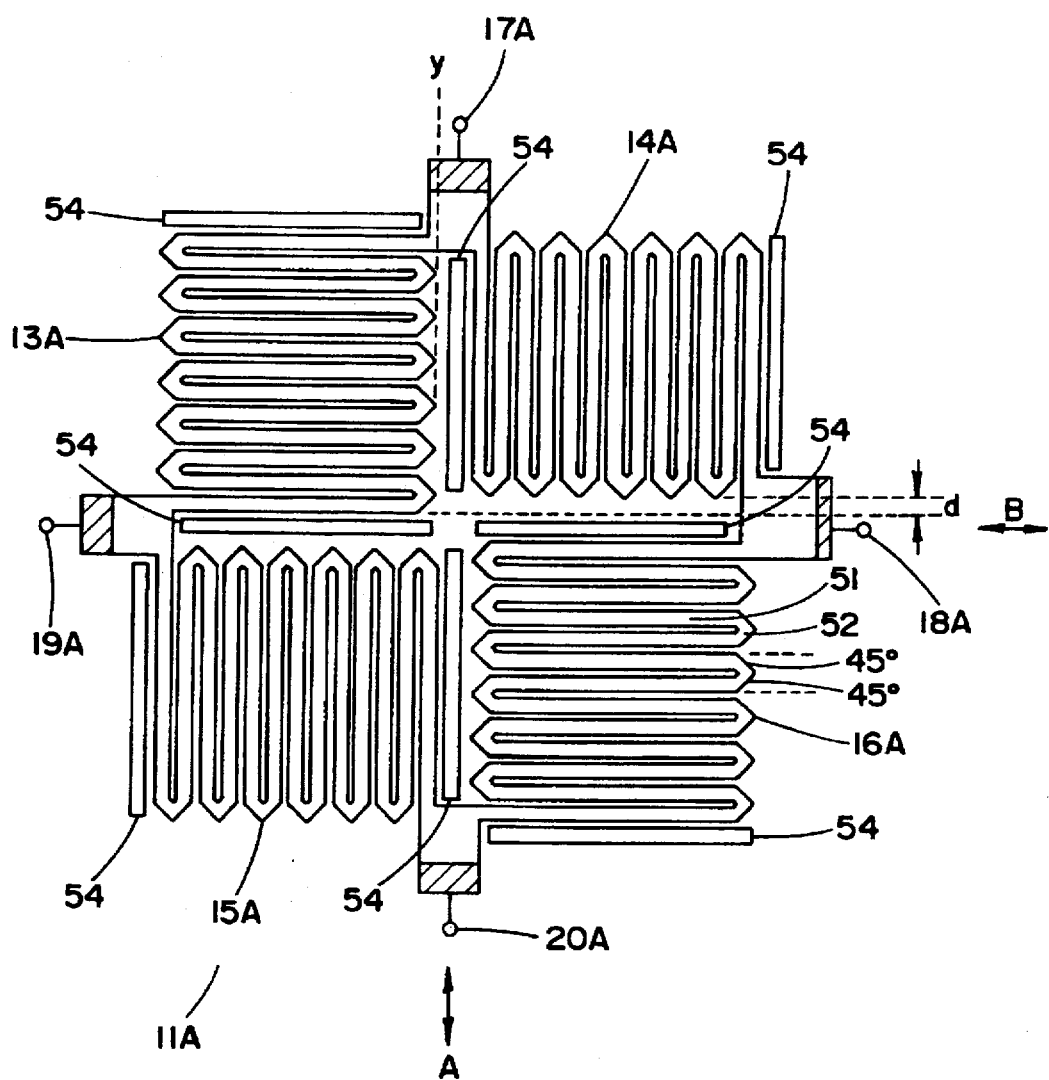
FIG. 4 is a plan view of the magnetically resistive element portion of one embodiment of an MR sensor according to the present invention.

FIG. 4 is a plan view showing a construction of the MR element portion in one embodiment of the MR sensor according to the present invention. It should be noted that elements that are similar to those of the conventional construction shown in FIG. 2 are represented by the same reference numerals plus and additional letter A. First and fourth MR elements 13A, 14A, 15A, 16A are formed from of a ferromagnetic thin film in a continuous pattern, in the meandering or zigzag shaped configuration. The MR elements 13A to 16A are arranged on a common plain in a 90° mutually rotated configuration. Terminals 17A to 20A are mounted at adjacent portions of the MR elements 13A to 16A, respectively.

Each of the MR elements 13A to 16A is formed with a plurality of line patterns 51, and connecting portion patterns 52 that connect tip ends of adjacent two line patterns 51. The line patterns 51 are arranged in parallel and close proximity to each other. At outer sides of the outermost line patterns 51 of respective MR elements 13A to 16A, line-shaped adjacent patterns 54 are arranged adjacent to the outermost line patterns 51.

The width of each adjacent line pattern 54 is greater than or equal to the width of the line pattern 51 of the MR elements 13A to 16A. The distance between the adjacent pattern 54 and the outermost line pattern 51 of the MR elements 13A to 16A is equal to the distance between the adjacent line patterns 51. The turned back portion of the connecting portion pattern 52 is formed into wedge shaped configuration with angles of +45° and −45° relative to the longitudinal direction of the line pattern 51.

The pattern length of the second MR element is shorter than those of the first, third and fourth MR elements 13A, 15A and 16A in the extent of the distance d. This is for making the potential of the terminal 18A to be higher than the potential of the terminal 19A in the absence of a magnetic field.

Similar to the conventional MR sensor as discussed in connection with FIG. 1, the embodiment of the MR sensor, shown in FIG. 4, also forms a bridge construction with the first to fourth MR elements 13A to 16A. Terminal 17A of the MR element portion 11A, having the first to fourth MR elements 13A to 16A, is connected to a power source terminal 22 as shown in FIG. 1. Terminal 20A is connected to the grounding terminal 23. On the other hand, terminal 19A is connected to the inverting (−) input terminal of the comparator 24, and terminal 18A is connected to the non-inverting (+) input terminal of the comparator 24.

The comparator 24 of the wave shaping processing circuit 12 performs wave shaping of the signals provided to the inverting (−) and non-inverting (+) input terminals. Namely, the comparator 24 derives a potential difference between both input terminals. The comparator 24 outputs an L level signal through the output terminal 29 (FIG. 1), when the potential difference between its two input terminals exceeds a first threshold level. On the other hand, when the potential difference is reduced below a second threshold level, the comparator 24 outputs an H level signal. Even in the embodiment shown FIG. 4, similarly to the circuit shown in FIG. 1, a feedback resistor 25 is connected between the (+) input terminal of the comparator 24 and the feedback terminal 27. The feedback resistor 25 has a resistance value greater than or equal to 1 MΩ. The feedback amount depends upon the output level in the preceding cycle. Also, an NPN transistor 28 is connected to the comparator 24. The open collector of the NPN transistor 28 serves as the output terminal 29.

Figure 5:
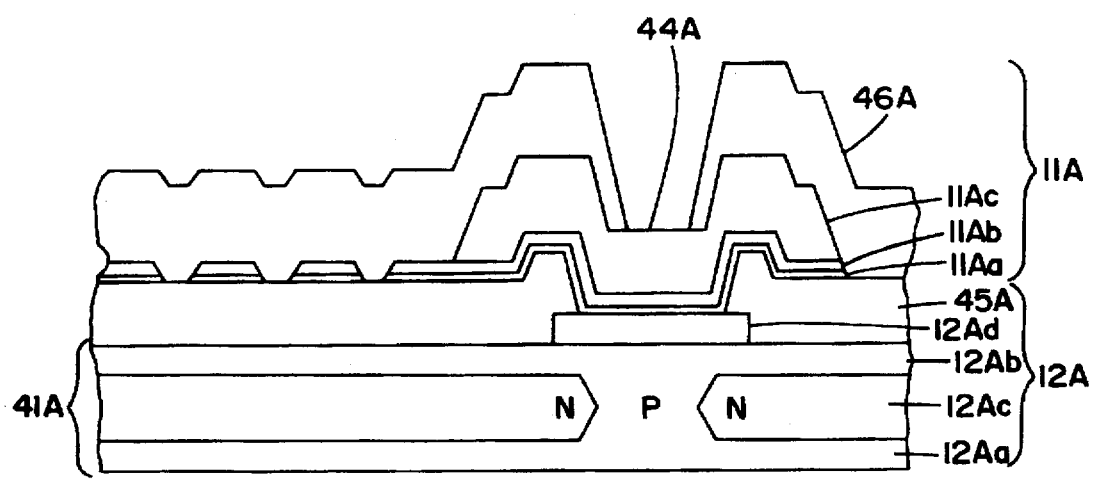
FIG. 5 is a cross section of the embodiment of the MR sensor shown in FIG. 4.

FIG. 5 shows a cross sectional view of the preferred embodiment of the MR sensor along the broken line y of FIG. 4. On the Si substrate 41A, a part of the bipolar type or MOS type wave shaping processing circuit 12A is formed. The wave shaping processing circuit 12A comprises a diffusion layer 12A$a$, a P layer 12A$b$, an N layer 12A$c$, an Al electrode and wiring layer 12A$d$, and so forth. On the wave shaping processing circuit portion 12A, an insulation layer 45A of Si-N is formed in the area other than the portion where the connecting pad portion 44A is formed. Here, to the connecting pad portion 44A, a power source voltage is provided having a voltage value of Vcc relative to terminal 17 of FIG. 2.

On the insulation layer 45A of the wave shaping processing circuit 12A, the MR element portion 11A is formed. The MR element portion 11A comprises a conductor undercoat layer 11A$a$ and a ferromagnetic thin film 11A$b$. The conductive undercoat later 11A$a$ is formed of Cr or Ti having a thickness of approximately several 10 to 1500 Å. On the other hand, the ferromagnetic thin film 11A$b$ is formed of Ni-Fe alloy or Ni-Fe-Co alloy having a thickness of approximately 300 to 600 Å.

In the MR element portion 11A, a conductive layer 11A$c$ of Au, having a thickness of approximately 1 to 1.5 µm, is formed over a portion of the ferromagnetic thin film 11A$b$, which portion does not include the location where the MR elements 13A to 16A are formed. A section of the MR element portion 11A, which section does not include the connecting pad portion 44A, is covered with a protective layer 46A of SiO$_2$ having a thickness of 0.5 to 2.0 µm.

Next, operation of the MR sensor, constructed as set forth above, is discussed. The width of the outermost pattern 51 of the MR elements 13A to 16A has a tendency to be thinner than other patterns 51 during formation of the pattern. The adjacent pattern 54 causes reduction of the outermost pattern width of the MR elements 13A to 16A to be equivalent to that of other pattern. Having equal pattern widths improves the MR ratio ΔR/R.

The MR ratio is inversely proportional to the length of the adjacent pattern 54 plus the length of the line pattern 51. In addition, the MR ratio is proportional to the width of the adjacent pattern 54 within an adjacent pattern range of 0 to 100 µm. The easy magnetization axis directions of respective of the MR elements 13A to 16A becomes the longitudinal direction of the pattern since the effect of configuration magnetic anisotropy is large.

Figure 6:
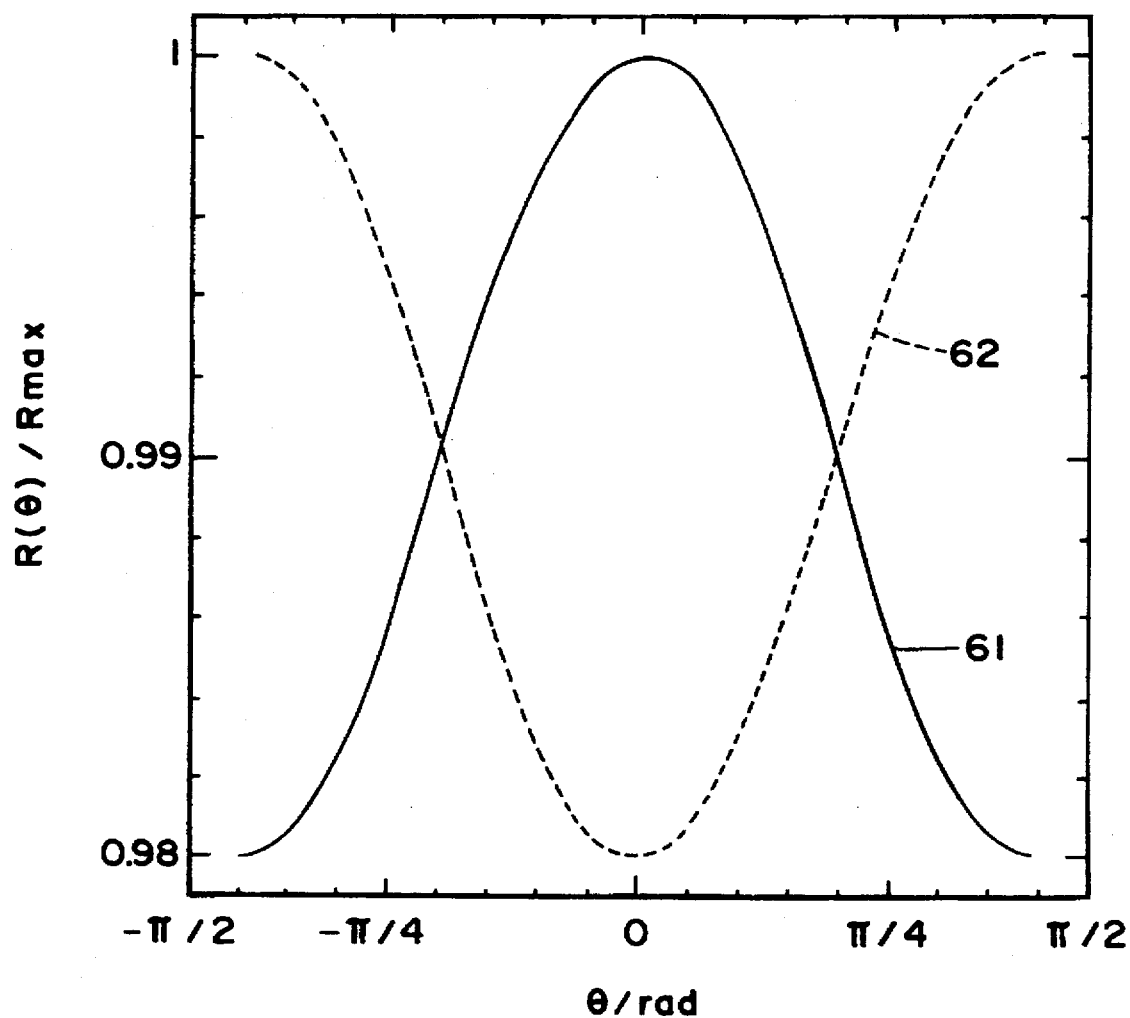
FIG. 6 is a characteristic chart showing the relationship between a resistance value of a connecting portion pattern of respective MR element and an angle θ, which angle is formed by the longitudinal direction of the line pattern and the connecting portion pattern, when a magnetic field is applied to the longitudinal direction of the line pattern and a direction perpendicular thereto.

FIG. 6 shows a relationship between the resistance value of the connecting portion pattern 52 (FIG. 4) of each of the MR elements as a function of angle θ (−90°≦θ≦90°), where θ is the angle of the connecting pattern 52 relative to the longitudinal direction of the line pattern 51. FIG. 6 shows this relationship for two directions of an applied magnetic field, namely, in the longitudinal direction of the line pattern 51, and the direction perpendicular to this longitudinal direction. In FIG. 6, the solid line 61 shows the case where the magnetic field is applied in the longitudinal direction, and the broken line 62 shows the case where the magnetic field is applied in the direction perpendicular to the longitudinal direction. It is assumed that the resistance value of the connecting portion pattern 52 is R. $R_{max}$ is the resistance value when the applied magnetic field is parallel to the longitudinal direction of the connecting portion pattern 52. $R_{min}$ is the resistance value when the applied magnetic field is perpendicular to the longitudinal direction.

As shown by curve 61 in FIG. 6, when the magnetic field is applied in the longitudinal direction of the line pattern 51, the resistance value becomes minimum when the connecting portion pattern 52 is ±90° (±Π/2), and becomes maximum when the connecting portion pattern 52 is 0°. The relationship between angle θ and the resistance value R are opposite when the applied magnetic field is rotated from a direction which is parallel to the longitudinal direction of the line pattern to the perpendicular direction thereto. Accordingly, when the angle θ is ±45° (±Π/4), the resistance values R become equal to each other.

As shown in FIG. 4, the connecting portion pattern 52 in the wedge shaped configuration, for connecting the tip ends of adjacent line patterns 51 at alternate sides, has the angle set at ±45° with respect to the longitudinal direction of the line pattern 51. With this construction, the influence of the magnetic characteristics at the connecting portion pattern 52, upon application of the operational magnetic field shown by the solid line 61 and the broken line 62 of FIG. 6, is successfully avoided.

Next, a second embodiment of the MR sensor according to the present invention is discussed.

Figure 7:
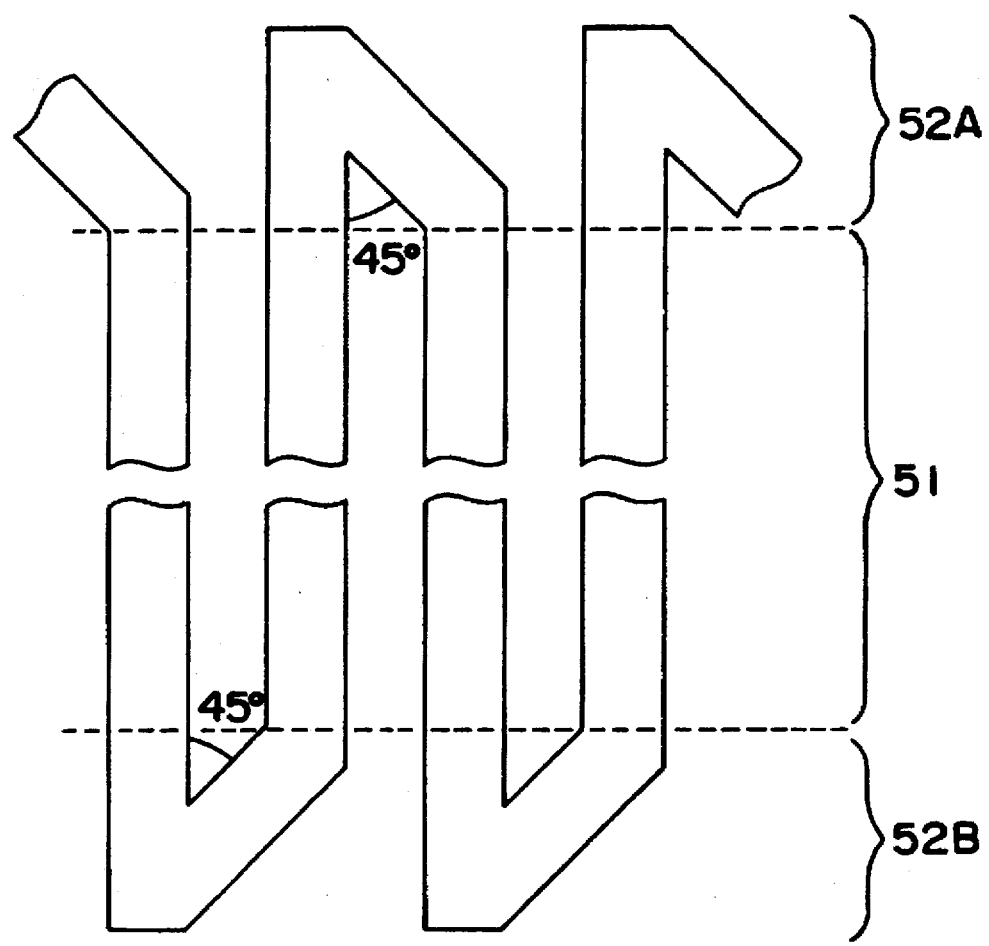
FIG. 7 is a plan view showing a major portion of the MR element of the second embodiment of the MR sensor according to the invention.

FIG. 7 shows a plan view of the major part of the MR element in the second embodiment of the magnetoresistive sensor according to the present invention. As shown in FIG. 7, the line patterns 51 are the same as those in the former embodiment shown in FIG. 4. However, the connecting portion patterns 52A and 52B are bent in only one direction, respectively. The bending direction of the connecting portion patterns 52A and 52B are mutually opposite each other. With this configuration shown in FIG. 7, resistance varies at the connecting portions 52A, 52B, as the magnetic field direction varies from a direction parallel to the line pattern 51 to a direction perpendicular thereto.

Figure 8:
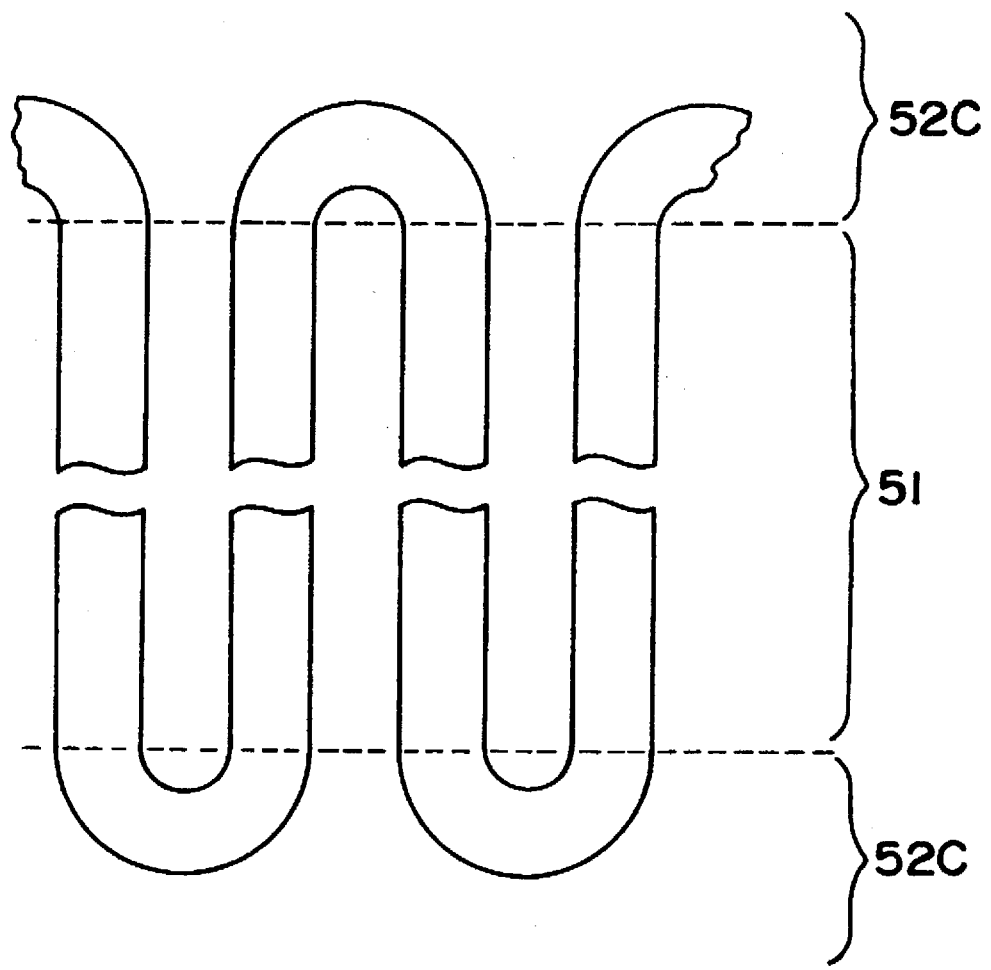
FIG. 8 is a plan view showing a major portion of the MR element of another embodiment of the MR sensor according to the invention.

Also as shown in FIG. 8, a similar effect may be obtained by employing a semi-circular connecting portion pattern 52C connected to the line patterns 51 at both ends.

It should be noted that, in the shown embodiment, the present invention has been discussed in terms of an integrated MR sensor, in which the MR element portion 11 and the wave shaping processing circuit portion 12 are integrated on a common substrate. However, it is not inherently required to form the MR element portion 11 and the wave shaping processing circuit portion 12 on a common substrate.

As set forth, according to the present invention, the connecting portion patterns 52, connecting the adjacent line patterns 51 (FIG. 4) to each other, are not covered with the conductive layer. Thus, the problem of resistance value fluctuation, caused by the conductive layer of prior art configurations, is successfully avoided. According to the present invention, the ferromagnetic thin films 11A*b* (FIG. 5) have similar construction with respect to each other within the region where the sensor is arranged. Thus, fluctuation of the resistance value will never be caused. In addition, the configuration of the MR elements is selected so as to prevent resistance variation due to the direction of the magnetic field. This allows obtaining an MR sensor with a high precision, and without causing degradation of the magnetic characteristics.

Moreover, the magnetically resistive body of the MR sensor according to the present invention is precisely and easily fabricated. Providing a higher precision of the resistance value of the MR body provides high precision of the offset voltage. Furthermore, derivative effect of improvement of the duty ratio, higher precision of ON magnetic field intensity is achieved.

Also, with the MR sensor according to the present invention, the adjacent pattern 54 (FIG. 4), in line form of ferromagnetic thin film, is formed adjacent to the outermost line pattern 51 of the MR element in parallel thereto. With this construction, degradation of the characteristics due to thinning of the width of the outermost line pattern portion, formed on the substrate, is avoided. This maintains the resistance value at high precision.

Furthermore, in the construction set forth above, four MR elements are provided, and among these, one or some of the magnetically resistive bodies and the other MR elements are arranged with intersecting line pattern portions. These magnetically resistive bodies are connected on the bridge. Then, a voltage is applied between one of the opposing pair of connecting points; and a voltage, which represents a potential difference depending upon the magnetic field, is measured from the remaining two connecting points. As set forth above, since respective MR elements form the bridge circuit as a whole, variation of the resistance value that depends upon variation of the magnetic field is measured with high precision.

Also, even when a plurality of MR elements are provided, a step coverage between the patterns is not formed. Accordingly, in comparison with the case of the conventional pattern turned back portion constructed with the MR effect thin film, the conductive layer and the protective layer, lower the possibility of breakage of the pattern irrespective of the step coverage of the protective layer.

Also, by inputting the output of the bridge circuit to the input of the hysteresis comparator, the output is compared with two threshold levels to output the wave-shaped signal. By this, influence of the noise to the output of the MR sensor is eliminated.

Furthermore, since the MR elements and the hysteresis comparator are integrated on a common substrate, downsizing of the device and lowering of the cost become possible. Also, four MR elements are employed and arranged with respective 90° of angular offset. With such a limitation, the orientation of the applied magnetic field, in the longitudinal direction of the line pattern of one of the MR elements, is also in the perpendicular direction of another MR element line pattern. Accordingly, the orientation of the magnetic field and so forth can be detected with high precision.

Furthermore, one of the MR elements has a different line pattern portion length than those of other MR elements. Thus, the bridge circuit is made unbalanced in the absence of a magnetic field. This makes the circuit stable.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within a scope encompassed and equivalents thereof with respect to the features set out in the appended claims.

What is claimed is:

1. A magnetoresistive sensor comprising:

magnetoresistive elements including a plurality of ferromagnetic thin films defining a plurality of line patterns having equal lengths to each other and arranged in parallel relative to each other, and an adjacent pattern of ferromagnetic thin film in line form, which is formed on a substrate in parallel to the line pattern adjacent to the outermost line pattern, said ferromagnetic thin films further defining connection patterns alternately connecting ends of adjacent line patterns of said line pattern ferromagnetic thin films, to form a zigzag pattern; and a terminal for externally detecting variation of resistance of said magnetoresistive elements, wherein an upper portion of said magnetoresistive elements is not covered with a conductive layer, and wherein said connecting pattern is set forth in an angled configuration having an angle of 45° relative to the direction of the line pattern.

2. A magnetoresistive sensor as set forth in claim 1, which further comprises at least four magnetoresistive elements, a part of these are arranged in an orientation perpendicularly intersecting the line pattern of other magnetoresistive elements.

said magnetoresistive elements are connected to voltage applying terminals for applying a voltage to opposing two contact points provided with voltage detecting terminals through which a voltage representative of a potential difference depending upon the magnetic field is taken out for the remaining two terminals.

3. A magnetoresistive sensor as set forth in claims 2, further comprising a hysteresis comparator for inputting the potentials detected at the voltage detecting terminals to two input terminals, and for comparing a difference of the potentials with two threshold levels to output a wave-shaped digital signal.

4. A magnetoresistive sensor as set forth in claim 3, wherein said magnetoresistive elements and said hysteresis comparator are integrated on a common substrate.

5. A magnetoresistive sensor as set forth in claim 1, which comprises four magnetoresistive elements, said four magnetoresistive elements being arranged with 90° of angular offset to each other to form four magnetoresistive sensors having mutually identical patterns, said magnetoresistive elements are arranged so that an applied magnetic field is in the direction along the longitudinal direction of the line patterns of one of the magnetoresistive elements and in the direction perpendicular to the longitudinal direction of the line pattern of the relevant magneto-resistive element.

6. A magnetoresistive sensor as set forth in claim 5, wherein the length of line patterns of one of said magnetoresistive elements is different from the length of the line patterns of other magnetoresistive elements.

7. A magnetoresistive sensor as set forth in claim 8, wherein said substrate is a silicon substrate.

8. A magnetoresistive sensor as set forth in claim 6, wherein said ferromagnetic thin film is formed of Ni-Fe alloy.

9. A magnetoresistive sensor as set forth in claim 6, wherein said ferromagnetic thin film is formed of Ni-Fe-Co alloy.

10. A magnetoresistive sensor as set forth in claim 6, which is a magnetoresistive sensor applicable for measuring rotation speed of an apparatus.

11. A magnetoresistive sensor as set forth in claim 6, which is a magnetoresistive sensor applicable for detecting a position of an apparatus.

12. A magnetoresistive sensor as set forth in claim 6, which is a magnetoresistive sensor applicable to a water flow meter for measuring the water flow of a water heater.

13. A magnetoresistive sensor as set forth in claim 6, which is a magnetoresistive sensor applicable as a speed meter for an automotive vehicle.

14. A magnetoresistive sensor comprising:

magnetoresistive elements including a plurality of ferromagnetic thin films defining a plurality of line patterns having equal lengths to each other and arranged in parallel relative to each other, and an adjacent pattern of ferromagnetic thin film in line form, which is formed on a substrate in parallel to the line pattern adjacent to the outermost line pattern, said ferromagnetic thin films further defining connection patterns alternately connecting ends of adjacent line patterns of said line pattern ferromagnetic thin films, to form a zigzag pattern; and a terminal for externally detecting variation of resistance of said magnetoresistive elements, wherein an upper portion of said magnetoresistive elements is not covered with the conductive layer, and said connecting patterns connect the line patterns in an arc-shaped configuration.

15. A magnetoresistive sensor as set forth in claim 14, which further comprises at least four magnetoresistive elements, a part of these are arranged in an orientation perpendicularly intersecting the line pattern of other magnetoresistive elements, said magnetoresistive elements are connected to voltage applying terminals for applying a voltage to opposing two contact points provided with voltage detecting terminals through which a voltage representative of a potential difference depending upon the magnetic field is taken out for the remaining two terminals.

16. A magnetoresistive sensor comprising: magnetoresistive elements including a plurality of ferromagnetic thin films defining a plurality of line patterns having equal lengths to each other and arranged in parallel relative to each other, said ferromagnetic thin films further defining connection patterns alternately connecting ends of adjacent line patterns of said line pattern ferromagnetic thin films, to form a zigzag pattern; and a terminal for externally detecting variation of resistance of said magnetoresistive elements, wherein an upper portion of said magnetoresistive elements is not covered with the conductive layer, and each of said connecting patterns connects the line patterns and each of said connecting patterns has an arc-shaped configuration forming a half-circle.

* * * * *

UNITED STATES PATENT AND TRADEMARK OFFICE
CERTIFICATE OF CORRECTION

PATENT NO. : 5,684,397
DATED : November 4, 1997
INVENTOR(S) : Kiyoma Ishishita

It is certified that error appears in the above-identified patent and that said Letters Patent is hereby corrected as shown below:

Column 14, Line 1, Claim: "Claim 8" should read --Claim 6--

Signed and Sealed this

Fourteenth Day of November, 2000

*Attest:*

Q. TODD DICKINSON

*Attesting Officer*      *Director of Patents and Trademarks*